United States Patent
Kunishi et al.

(10) Patent No.: US 10,640,306 B2
(45) Date of Patent: May 5, 2020

(54) POLYCARBONATE RESIN POWDER AND METHOD FOR TRANSPORTING SAME

(71) Applicant: IDEMITSU KOSAN CO., LTD., Tokyo (JP)

(72) Inventors: Noriyuki Kunishi, Ichihara (JP); Kenji Sasaki, Ichihara (JP); Yukiko Nagao, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 74 days.

(21) Appl. No.: 15/894,649

(22) Filed: Feb. 12, 2018

(65) Prior Publication Data

US 2018/0162658 A1 Jun. 14, 2018

Related U.S. Application Data

(62) Division of application No. 15/526,461, filed as application No. PCT/JP2015/082227 on Nov. 17, 2015, now abandoned.

(30) Foreign Application Priority Data

Nov. 17, 2014 (JP) ................................ 2014-232718

(51) Int. Cl.

| | |
|---|---|
| *B65G 53/60* | (2006.01) |
| *B65G 53/04* | (2006.01) |
| *C08G 77/448* | (2006.01) |
| *B01D 39/08* | (2006.01) |
| *B01D 46/02* | (2006.01) |
| *C08G 64/18* | (2006.01) |

(52) U.S. Cl.
CPC ........... *B65G 53/04* (2013.01); *B01D 39/083* (2013.01); *B01D 46/023* (2013.01); *B65G 53/60* (2013.01); *C08G 64/186* (2013.01); *C08G 77/448* (2013.01); *B01D 2239/0492* (2013.01)

(58) Field of Classification Search
None
See application file for complete search history.

(56) References Cited

U.S. PATENT DOCUMENTS

| | | | |
|---|---|---|---|
| 2009/0061220 A1 | 3/2009 | Nodera et al. | |
| 2013/0225763 A1* | 8/2013 | Pai-Paranjape | ........ C08G 64/04 524/611 |
| 2014/0296469 A1 | 10/2014 | Ishikawa et al. | |

FOREIGN PATENT DOCUMENTS

| | | |
|---|---|---|
| CN | 101155876 A | 4/2008 |
| CN | 103958564 A | 7/2014 |
| JP | S63-071021 A | 3/1988 |
| JP | H06-65364 A | 3/1994 |
| JP | 6-100703 A | 4/1994 |
| JP | H06-270145 A | 9/1994 |
| JP | 11139561 * | 5/1999 |
| JP | 2000-168725 A | 6/2000 |
| JP | 2000-177845 A | 6/2000 |
| JP | 2007-319833 A | 12/2007 |
| JP | 2008-037965 A | 2/2008 |
| JP | 2011-021127 A | 2/2011 |
| JP | 2012-236955 A | 12/2012 |
| JP | 2012236955 * | 12/2012 |
| JP | 2013-245082 A | 12/2013 |
| JP | 5795110 B1 | 10/2015 |
| JP | 2015-189897 A | 11/2015 |
| TW | 201326314 A | 7/2013 |

OTHER PUBLICATIONS

International Search Report and Written Opinion (and English-language translation of International Search Report), PCT/JP2015/082227, Idemitsu Kosan Co., Ltd., 8 pages (dated Feb. 16, 2016).
JP Office Action issued in the corresponding Patent Application Ser. No. 2016-560231, dated Jul. 2, 2019.

\* cited by examiner

*Primary Examiner* — David J Buttner
(74) *Attorney, Agent, or Firm* — Foley & Lardner LLP

(57) ABSTRACT

Provided is a polycarbonate resin powder, including a polycarbonate-polyorganosiloxane copolymer, in which an amount of particles each having a particle diameter of 300 μm or less in an entirety of the powder is 60 mass % or less.

8 Claims, No Drawings

POLYCARBONATE RESIN POWDER AND METHOD FOR TRANSPORTING SAME

This application is a Divisional application filed under 35 U.S.C. § 111(a) claiming the benefit under 35 U.S.C. §§ 120 of U.S. patent application Ser. No. 15/526,461, filed May 12, 2017, now abandoned which is a national stage application of PCT/JP2015/082227, filed Nov. 17, 2015, which claims the benefit of and priority to Japanese Patent Application No. 2014-232718, filed Nov. 17, 2014, the entire contents of which are hereby incorporated by reference in their entireties.

TECHNICAL FIELD

The present invention relates to a polycarbonate resin powder containing a polycarbonate-polyorganosiloxane copolymer and a method of transporting the powder.

BACKGROUND ART

A polycarbonate-polyorganosiloxane copolymer has high impact resistance, high chemical resistance, and high flame retardancy, and has been expected to find utilization in a wide variety of fields, such as the field of electrical and electronic equipment and the field of an automobile.

The polycarbonate-polyorganosiloxane copolymer can be produced by, for example, an interfacial polymerization reaction (Patent Document 1). The polycarbonate-polyorganosiloxane copolymer obtained after the polymerization can be subjected to a powdering/granulation treatment with a kneader or the like to be turned into a powder. The powder is subjected to various steps while being, for example, pneumatically transported, and then the resultant is separated into a gas and a powder with a separator. Thus, a target polycarbonate-polyorganosiloxane powder can be obtained. The resultant powder can be, for example, further pelletized with a pelletizer or the like to be turned into various molded bodies. The pneumatic transportation has advantages over mechanical transportation, such as the simplification of a transportation line, the prevention of the scattering of harmful dust, and the prevention of the inclusion of foreign matter into a substance to be transported.

CITATION LIST

Patent Document

Patent Document 1: JP 06-65364 A

SUMMARY OF INVENTION

Technical Problem

In the course of their investigations, the inventors of the present invention have obtained the finding that a polycarbonate resin powder containing a polycarbonate-polyorganosiloxane copolymer has an adhesive property higher than that of a homopolycarbonate resin powder. As the adhesive property of the powder is raised, separation failure in a separator having a filter to be used at the time of the separation of the powder from a pneumatically transported multiphase fluid occurs to result in a problem in that an air amount needed for transportation in a transportation line cannot be secured. When the particle diameter of the polycarbonate resin powder containing the polycarbonate-polyorganosiloxane copolymer is small, i.e., the amount of a fine powder is large, the surface area of the powder increases to further raise the adhesive property, and hence the problem becomes remarkable.

The inventors of the present invention have found that a resin powder reduced in adhesive property can be obtained by reducing the fine powder amount of a polycarbonate resin powder containing a polycarbonate-polyorganosiloxane copolymer, and hence a problem at the time of pneumatic transportation can be avoided.

That is, the present invention provides a polycarbonate resin powder containing a polycarbonate-polyorganosiloxane copolymer and a method of transporting the powder described in the following items [1] to [13].

[1] A polycarbonate resin powder, comprising a polycarbonate-polyorganosiloxane copolymer comprising: a polycarbonate block (A) having a repeating unit represented by the following general formula (I); and a polyorganosiloxane block (B) having a repeating unit represented by the following general formula (II), wherein an amount of particles each having a particle diameter of 300 μm or less in an entirety of the powder is 60 mass % or less:

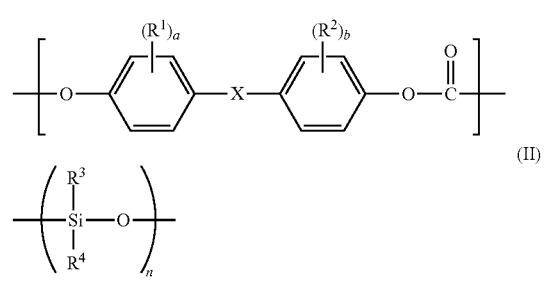

wherein:

$R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4; and $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and n represents the total number of siloxane repeating units in the polyorganosiloxane block.

[2] The polycarbonate resin powder according to Item [1], wherein the powder has an angle of repose of 42.5° or less.

[3] The polycarbonate resin powder according to Item [1] or [2], wherein the polycarbonate-polyorganosiloxane copolymer has a viscosity-average molecular weight (Mv) of from 15,500 to 30,000.

[4] The polycarbonate resin powder according to any one of Items [1] to [3], wherein the polycarbonate resin powder has a mean area diameter of from 0.10 mm to 1.00 mm.

[5] The polycarbonate resin powder according to any one of Items [1] to [4], wherein n in the general formula (II) represents from 20 to 500.

[6] The polycarbonate resin powder according to any one of Items [1] to [5], wherein a content of a polyorganosiloxane block moiety in the polycarbonate resin powder is from 1.0 mass % to 50 mass %.

[7] A method of transporting a polycarbonate resin powder, the method comprising pneumatically transporting the polycarbonate resin powder of any one of Items [1] to [6].

[8] The method of transporting a polycarbonate resin powder according to Item [7], wherein the pneumatically transporting is performed at a gas velocity of from 7 m/s to 30 m/s.

[9] The method of transporting a polycarbonate resin powder according to Item [7] or [8], wherein the pneumatically transporting is performed using nitrogen as a gas.

[10] The method of transporting a polycarbonate resin powder according to any one of Items [7] to [9], further comprising separating the gas and the powder with a separator, wherein the separator has a filter.

[11] The method of transporting a polycarbonate resin powder according to Item [10], wherein the filter comprises a bag filter.

[12] The method of transporting a polycarbonate resin powder according to Item [11], wherein the bag filter has a filter cloth having a polyester substrate coated with polytetrafluoroethylene.

[13] The method of transporting a polycarbonate resin powder according to Item [12], wherein the filter cloth has a thickness of from 1 mm to 3 mm, a mass per unit area of from 300 g/m² to 600 g/m², and an air permeability of from 3 cm/s to 10 cm/s.

Advantageous Effects of Invention

According to the present invention, the polycarbonate resin powder that can be efficiently recovered from the inside of a multiphase fluid to be pneumatically transported, and the method of transporting the powder can be provided.

DESCRIPTION OF EMBODIMENTS

<Polycarbonate Resin Powder>

A polycarbonate resin powder of the present invention comprises a polycarbonate-polyorganosiloxane copolymer comprising: a polycarbonate block (A) having a repeating unit represented by the following general formula (I); and a polyorganosiloxane block (B) having a repeating unit represented by the following general formula (II), wherein an amount of particles each having a particle diameter of 300 μm or less in an entirety of the powder is 60 mass % or less:

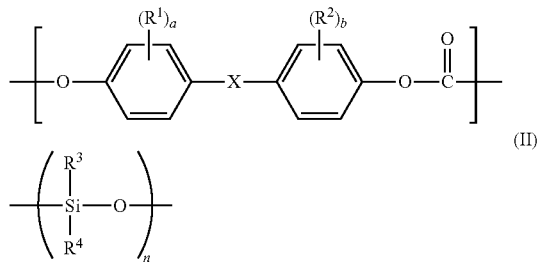

wherein:

$R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO₂—, —O—, or —CO—, and a and b each independently represent an integer of from 0 to 4, and $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and n represents the total number of siloxane repeating units in the polyorganosiloxane block.

The average number n of repetitions in the formula (II) represents preferably from 20 to 500, more preferably from 30 to 450, still more preferably from 50 to 400, still further more preferably from 70 to 300. When n represents 20 or more, an excellent impact resistance can be obtained and significant restoration of the impact resistance can be achieved. When n represents 500 or less, handleability at the time of the production of the polycarbonate-polyorganosiloxane copolymer (PC-POS) becomes excellent. The number n of the repeating units can be calculated by ¹H-NMR.

The content of a polyorganosiloxane block moiety in the polycarbonate resin powder is preferably from 1.0 mass % to 50 mass %, more preferably from 1.0 mass % to 20 mass %, still more preferably from 3.0 mass % to 12 mass % from the viewpoint of, for example, a balance among a flame retardancy-imparting effect, an impact resistance-imparting effect, and economical efficiency.

The particle diameter of the powder is determined by measurement in conformity with a dry sieving test described in JIS-Z-8815.

When the amount of the particles each having a particle diameter of 300 μm or less in the entirety of the powder is more than 60 mass %, the surface area of the powder increases and hence an adhesive property peculiar to the polycarbonate resin powder containing the polycarbonate-polyorganosiloxane copolymer becomes so high that the clogging of a filter to be used at the time of the separation of the powder from a multiphase fluid at the time of pneumatic transportation to be described later occurs. The amount of the particles each having a particle diameter of 300 μm or less is preferably 55 mass % or less.

The angle of repose of the polycarbonate resin powder is preferably 42.5° or less. The angle of repose is measured in conformity with JIS-R-9301-2-2.

When the angle of repose of the powder is 42.5° or less, the amount of a fine powder reduces, and hence the clogging of the filter to be used at the time of the separation of the powder from the multiphase fluid at the time of the pneumatic transportation can be avoided. The angle of repose is more preferably 42° or less, still more preferably 41° or less.

The mean area diameter of the polycarbonate resin powder is preferably from 0.10 mm to 1.00 mm. The mean area diameter of the powder is determined on the basis of the particle diameter measured in conformity with the dry sieving test described in JIS-Z-8815.

When the mean area diameter of the powder is 0.10 mm or more, a situation in which the specific surface area of the powder increases to raise the adhesive property of the powder can be avoided. When the mean area diameter is 1.00 mm or less, efficiency at the time of the removal of a solvent from the powder in the step of drying the powder does not reduce. The mean area diameter of the powder is more preferably from 0.15 mm to 0.80 mm, still more preferably from 0.20 mm to 0.50 mm.

The viscosity-average molecular weight (Mv) of the polycarbonate-polyorganosiloxane copolymer to be incorporated into the polycarbonate resin powder of the present invention is preferably from 15,500 to 30,000. When the viscosity-average molecular weight falls within the range, the amount of the particles each having a particle diameter of 300 μm or less in the entirety of the polycarbonate resin powder can be set to 60 mass % or less.

The control of the viscosity-average molecular weight of the polycarbonate-polyorganosiloxane copolymer to be incorporated into the polycarbonate resin powder can be given as one method of controlling the particle diameter of the polycarbonate resin powder. When the Mv of the polycarbonate-polyorganosiloxane copolymer is excessively low, a fine powder is liable to occur at the time of granulation with a kneader or the like. In the present invention, the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C. with an Ubbelohde-type viscosity tube.

The polycarbonate resin powder containing the polycarbonate-polyorganosiloxane copolymer of the present invention can be obtained by, for example, preparing the polycarbonate-polyorganosiloxane copolymer as described below and then powdering/granulating the copolymer with a kneader or the like.

<Polycarbonate-Polyorganosiloxane Copolymer>

The polycarbonate-polyorganosiloxane copolymer in the polycarbonate resin powder of the present invention can be obtained by introducing a polycarbonate oligomer, an alkaline aqueous solution of a dihydric phenol, a polyorganosiloxane, and a polymerization catalyst into a polycondensation reaction zone, and subjecting the raw materials to a polycondensation reaction in the polycondensation reaction zone. The respective raw materials are described in detail below.

<Polycarbonate Oligomer>

The polycarbonate oligomer is prepared by causing the dihydric phenol and a carbonate precursor to react with each other. A method of preparing the polycarbonate oligomer is not particularly limited, and for example, the following method can be preferably used.

The reaction between the dihydric phenol and the carbonate precursor is not particularly limited, and a known method can be adopted. The reaction is preferably performed in the presence of an organic solvent by an interfacial polymerization method. The phenol and the precursor can be caused to react with each other in the presence of a molecular weight modifier and the polymerization catalyst as required. The dihydric phenol is used as the alkaline aqueous solution of the dihydric phenol obtained by dissolving the dihydric phenol in an aqueous solution of an alkaline compound.

<Dihydric Phenol>

A dihydric phenol represented by the following general formula (1) is preferably used as the dihydric phenol:

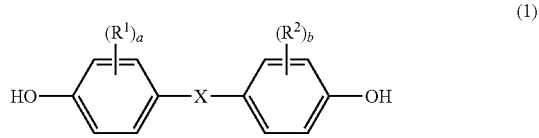

(1)

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4.

Examples of the dihydric phenol include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, and dihydroxydiaryladamantanes. One of those dihydric phenols may be used alone, or two or more thereof may be used as a mixture.

Examples of the bis(hydroxyaryl)alkanes include bis(4-hydroxyphenyl)methane, 1,1-bis(4-hydroxyphenyl)ethane, 2,2-bis(4-hydroxyphenyl)propane [bisphenol A], 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenols except the above-mentioned dihydric phenols include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

Among them, as the dihydric phenol, bis(hydroxyaryl)alkanes are preferred, bis(hydroxyphenyl)alkanes are more preferred, and bisphenol A is still more preferred. When bisphenol A is used as the dihydric phenol, in the resultant polycarbonate-polyorganosiloxane copolymer, X represents an isopropylidene group and a=b=0 in the general formula (1).

<Carbonate Precursor>

Phosgene and phosgene derivatives, such as triphosgene, phosgene dimer, bromophosgene, bisimidazole ketone, and bis(p-nitrophenyl)carbonate, can each be used as the carbonate precursor. Among them, phosgene and bromophosgene are preferred, and phosgene is more preferred.

<Alkaline Aqueous Solution>

Examples of the alkaline aqueous solution may include aqueous solutions of alkaline inorganic compounds including: alkali metal hydroxides, such as sodium hydroxide and potassium hydroxide; and alkaline earth metal hydroxides, such as magnesium hydroxide and calcium hydroxide. Among them, an aqueous solution of an alkali metal hydroxide is preferred, and an aqueous solution of sodium hydroxide is more preferred.

Normally, a solution having an alkali concentration of from 1 mass % to 15 mass % is preferably used as the alkaline aqueous solution for dissolving the dihydric phenol. The amount of the dihydric phenol in the alkaline aqueous solution of the dihydric phenol is typically selected from the range of from 0.5 mass % to 20 mass %.

<Organic Solvent>

The organic solvent is, for example, an organic solvent that dissolves the dihydric phenol and the polycarbonate oligomer. Specific examples thereof include halogenated hydrocarbon solvents, such as dichloromethane (methylene chloride), dichloroethane, trichloroethane, tetrachloroethane, pentachloroethane, hexachloroethane, dichloroethylene, chlorobenzene, and dichlorobenzene. Among them, dichloromethane (methylene chloride) is particularly preferred. The usage amount of the organic solvent is typically selected so that a volume ratio between an organic phase and an aqueous phase may be from preferably 5/1 to 1/7, more preferably from 2/1 to 1/4.

A reaction temperature in the preparation of the polycarbonate oligomer is selected from the range of typically from 0° C. to 80° C., preferably from 5° C. to 70° C.

<Polymerization Catalyst>

Examples of the polymerization catalyst include a tertiary amine and a quaternary ammonium salt. Examples of the tertiary amine include trimethylamine, triethylamine, and tripropylamine. Examples of the quaternary ammonium salt include trimethylbenzylammonium chloride and triethylbenzylammonium chloride. As the polymerization catalyst, a tertiary amine is preferred, and triethylamine is more preferred.

<Molecular Weight Modifier>

When the oligomer is prepared, a molecular weight modifier may be added as required. The molecular weight modifier is not particularly limited as long as the molecular weight modifier is a monohydric phenol, and examples thereof include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, p-bromophenol, 2,4,6-tribromophenol, a monoalkyl phenol having a linear or branched alkyl group having an average number of carbon atoms of from 12 to 35 at the ortho-, meta-, or para-position, 3-pentadecylphenol, 9-(4-hydroxyphenyl)-9-(4-methoxyphenyl)fluorene, 9-(4-hydroxy-3-methylphenyl)-9-(4-methoxy-3-methylphenyl)fluor ene, and 4-(1-adamantyl) phenol. Among them, p-t-butylphenol, p-cumylphenol, and p-phenylphenol are preferred, and p-t-butylphenol is more preferred.

The resultant reaction mixture is a mixture containing an organic phase containing the polycarbonate oligomer and an aqueous phase containing impurities, such as sodium chloride. Accordingly, the organic phase containing the polycarbonate oligomer obtained by performing, for example, settled separation is used in the polycondensation step of producing the copolymer.

The weight-average molecular weight (Mw) of the polycarbonate oligomer is generally less than 5,000. A lower limit for the weight-average molecular weight of the polycarbonate oligomer is typically about 500.

<Polycarbonate-polyorganosiloxane Copolymer>

The polycarbonate-polyorganosiloxane copolymer is produced by: introducing the polycarbonate oligomer, the polyorganosiloxane, and the alkaline aqueous solution of the dihydric phenol into the polycondensation reaction zone; adding the polymerization catalyst, the molecular weight modifier, the alkaline aqueous solution, and a water-insoluble organic solvent as required; and subjecting the raw materials to interfacial polymerization.

An example of the polycondensation step is specifically described. The polycarbonate oligomer, the polyorganosiloxane to be described later, the water-insoluble organic solvent, and the alkaline aqueous solution are mixed optionally in the presence of the polymerization catalyst, and are caused to react with one another at a temperature in the range of typically from 0° C. to 50° C., preferably from 20° C. to 40° C.

Next, the molecular weight modifier, the alkaline aqueous solution, and the alkaline aqueous solution of the dihydric phenol are mixed into the resultant, and the polycondensation reaction is completed at a temperature in the range of typically from 0° C. to 50° C., preferably from 20° C. to 40° C.

Examples of the alkaline aqueous solution, the water-insoluble organic solvent, the polymerization catalyst, the dihydric phenol, and the molecular weight modifier in the polycondensation step may include those described above.

<Polyorganosiloxane>

A polyorganosiloxane represented by the following general formula (2), (3), and/or (4) can be used as the polyorganosiloxane:

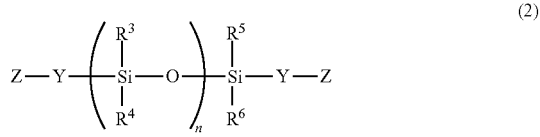

(2)

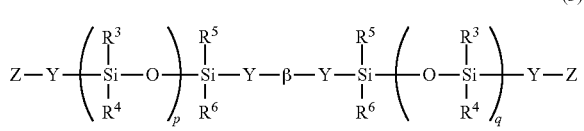

(3)

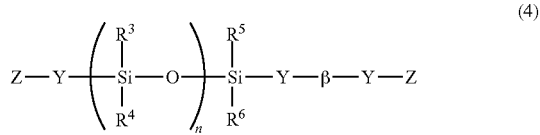

(4)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7O$—, —$R^7COO$—, —$R^7NH$—, —$R^7NR^8$—, —COO—, —S—, —$R^7COO$—$R^9$—O—, or —$R^7O$—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, a sum of p and q is n, and n represents an average number of repetitions.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

The polyorganosiloxane represented by the general formula (2), (3), and/or (4) is preferably a polyorganosiloxane in which $R^3$ to $R^6$ each represent a methyl group.

The linear or branched alkylene group represented by $R^7$ in —$R^7O$—, —$R^7COO$—, —$R^7NH$—, —$R^7NR^8$—, —COO—, —S—, —$R^7COO$—$R^9$—O—, or represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and its specific structure may be, for example, a structure represented by the following general formula (5) or (6). When the polyorganosiloxane has the aryl-substituted alkylene group, the alkylene group is bonded to Si.

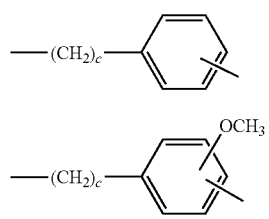

(5)

(6)

In the formulae, c represents a positive integer and typically represents an integer of from 1 to 6.

The diarylene group represented by each of $R^7$, $R^9$, and $R^{10}$ refers to a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by each of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched alkyl group having 1 to 8, preferably 1 to 5 carbon atoms. The alkenyl group represented by $R^8$ is, for example, a linear or branched alkenyl group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7O$—, and $R^7$ represents an aryl-substituted alkylene group, in particular a residue of a phenol-based compound having an alkyl group, and more preferably represents an organic residue derived from allylphenol or an organic residue derived from eugenol.

With regard to p and q in the general formula (3), it is preferred that p=q, i.e., p=n/2 and q=n/2.

As described above, the average number n of repetitions is preferably from 20 to 500, more preferably from 30 to 450, still more preferably from 50 to 400, still further more preferably from 70 to 300.

In addition, β represents a divalent group derived from a diisocyanate compound, or a divalent group derived from a dicarboxylic acid or a halide of a dicarboxylic acid, and examples thereof include divalent groups represented by the following general formulae (7-1) to (7-5).

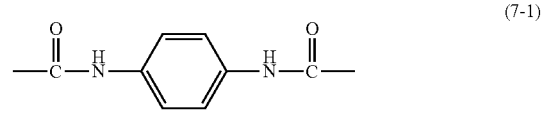

(7-1)

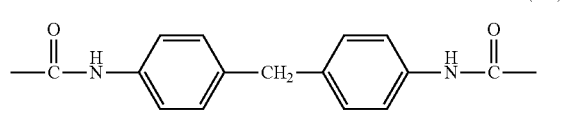

(7-2)

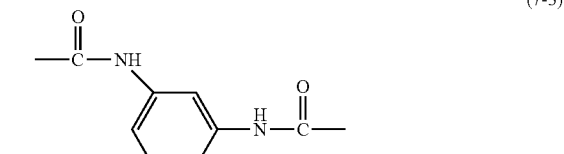

(7-3)

(7-4)

-continued

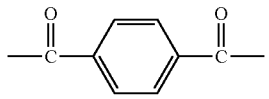
(7-5)

Examples of the polyorganosiloxane represented by the general formula (2) include compounds represented by the following general formulae (2-1) to (2-11):

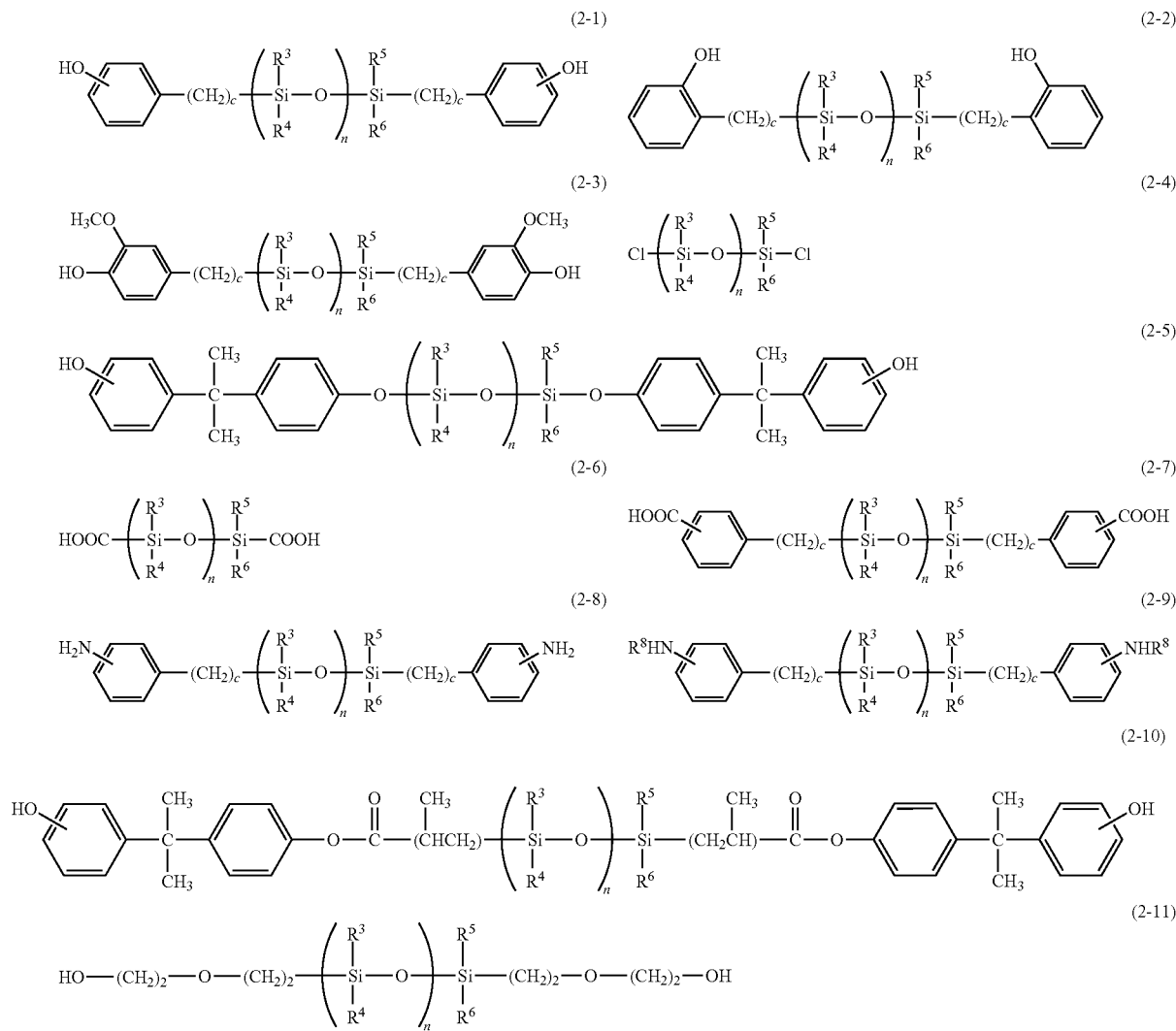

In the general formulae (2-1) to (2-11), $R^3$ to $R^6$, n, and $R^8$ are as defined above, and preferred groups and values thereof are also the same. c represents a positive integer and typically represents an integer of from 1 to 6.

Among them, a phenol-modified polyorganosiloxane represented by the general formula (2-1) is preferred from the viewpoint of the ease of polymerization. From the viewpoint of the ease of availability, α,ω-bis[3-(o-hydroxyphenyl)propyl]-polydimethylsiloxane as one of the compounds each represented by the general formula (2-2) or α, ω-bis[3-(4-hydroxy-3-methoxyphenyl)propyl]-polydimethylsiloxane as one of the compounds each represented by the general formula (2-3) is preferred.

After a reaction liquid obtained by the polycondensation step has been subsequently separated, washed, and concentrated, a known method, such as a kneader method, a hot water granulation method, or a powder bed granulation method, can be used for powdering/granulating a concentrated organic phase containing the polycarbonate-polyorganosiloxane copolymer, though the method for the powdering/granulation is not described in detail. After the performance of the powdering/granulation, in normal cases, the resultant powder (flake) or granulated product is preferably dried under reduced pressure at from about 80° C. to about 160° C.

In addition to the setting of the viscosity-average molecular weight of the copolymer to a specific value as described above, the following method is adopted as a method of controlling the particle diameter of the polycarbonate resin powder of the present invention: through the change of the operation condition of a kneader in the case of the performance of the powdering/granulation by the kneader method, the particle diameter can be controlled so that no fine powder may occur.

For example, when such a kneader as described in JP 53-15889 B is used, the production amount of a fine powder can be reduced by reducing its number of revolutions to 20 rpm. However, when the number of revolutions is further reduced, the resin powder containing the solvent stays in the machine to cause its adhesion. Accordingly, the performance of such reduction leads to low efficiency.

In the kneader method, the particle diameter is controlled by pulverizing a coarse powder obtained at the outlet of the kneader with a pulverizer (crusher) in some cases. Here, when the number of revolutions of the crusher is controlled, the particle diameter can be controlled so that no fine powder may occur.

<Method of Transporting Polycarbonate Resin Powder>

In a transportation method of the present invention, the polycarbonate resin powder powdered/granulated by the kneader method or the like is pneumatically transported. The performance of the pneumatic transportation can achieve the simplification of a transportation line, the prevention of the scattering of harmful dust, and the prevention of the inclusion of foreign matter into a product to be transported.

Nitrogen is preferred as a gas to be used in the pneumatic transportation.

A gas velocity in a transportation pipe at the time of the pneumatic transportation is preferably from 7 m/s to 30 m/s, more preferably from 10 m/s to 20 m/s. When the gas velocity is 7 m/s or more, the following risk is eliminated: the resin powder stays in the pipe to make it difficult to transport the resin powder. Meanwhile, when the gas velocity is 30 m/s or less, the amount of nitrogen is proper and hence high efficiency is achieved.

The polycarbonate resin powder powdered/granulated by the kneader method or the like is pneumatically transported, and the gas and the powder are separated from the inside of the transported multiphase fluid with a separator having a filter. A bag filter can be preferably used as the separator having the filter.

The polycarbonate resin powder of the present invention has involved the following problem because the powder contains the polycarbonate-polyorganosiloxane copolymer: the powder has a high adhesive property and is hence liable to cause filter clogging at the time of the separation of the multiphase fluid with the bag filter or the like to remarkably reduce the life of the filter or the operation ratio of the bag filter. However, the polycarbonate resin powder of the present invention can avoid the clogging problem because the amount of a fine powder in the powder is small.

In the bag filter, for example, a filter cloth having a polyester substrate coated with polytetrafluoroethylene is preferably used. A filter cloth having a thickness of from 1 mm to 3 mm, a mass per unit area of from 300 g/m² to 600 g/m², and an air permeability of from 3 cm/s to 10 cm/s can be preferably used as the filter cloth.

In order that a product having stable quality may be obtained, a so-called blending operation in which a powder stored in a silo is discharged and received by the silo again to be circulated is performed in some cases. At this time, the polycarbonate resin powder of the present invention can avoid the clogging problem in the bag filter. Accordingly, the circulation of the powder by the pneumatic transportation and the separation thereof with the bag filter can be performed, and hence the operation can be efficiently performed.

EXAMPLES

The present invention is described in more detail below by way of examples. The present invention is not limited by these examples.

[Evaluation Method]

(1) Viscosity-average Molecular Weight

A viscosity-average molecular weight was calculated from the following relational expression (Schnell's equation) by measuring the limiting viscosity [η] of a methylene chloride solution at 20° C. with an Ubbelohde-type viscosity tube.

$$[\eta]=1.23\times10^{-5}\times Mv^{0.83}$$

(2) Amount of Particles Each Having Particle Diameter of 300 μm or Less

The amount of particles each having a particle diameter of 300 μm or less was measured in accordance with a dry sieving test in conformity with JIS-Z-8815. In the dry sieving test, the ratio of a powder sieved with a metal mesh sieve specified in JIS-Z-8801-1 having an aperture of 300 μm was determined.

(3) Mean Area Diameter

An mean area diameter was measured in accordance with the dry sieving test in conformity with JIS-Z-8815. In the dry sieving test, particles were sieved by vibrating a superimposed product of metal mesh sieves specified in JIS-Z-8801-1 having apertures of 5,600 μm, 2,360 μm, 1,180 μm, 600 μm, 300 μm, 150 μm, and 75 μm, and the mean area diameter was determined by calculation from the mass ratios of the sieved particles.

(4) Angle of Repose

An angle of repose was measured by a method in conformity with JIS-R-9301-2-2.

Example 1

A polycarbonate-polyorganosiloxane copolymer having a viscosity-average molecular weight (Mv) of 17,000 (number n of repeating units=40, polyorganosiloxane moiety content=6 mass %) was polymerized by an interfacial polymerization method according to the following procedure. After that, the copolymer was powdered with a kneader and dried with a steam-tube dryer to provide a polycarbonate resin powder.

[Production of Polycarbonate Oligomer Solution]

To 5.6 mass % aqueous sodium hydroxide, sodium dithionite was added in an amount of 2,000 ppm by mass relative to bisphenol A to be dissolved later, and bisphenol A was then dissolved therein so that the concentration of bisphenol A became 13.5 mass %, to thereby prepare a solution of bisphenol A in aqueous sodium hydroxide.

The solution of bisphenol A in aqueous sodium hydroxide, methylene chloride, and phosgene were continuously passed through a tubular reactor having an inner diameter of 6 mm and a tube length of 30 mat flow rates of 40 L/hr, 15 L/hr, and 4.0 kg/hr, respectively. The tubular reactor had a jacket portion, and cooling water was passed through the jacket to keep the reaction liquid at a temperature of 40° C. or less.

The reaction liquid that had exited the tubular reactor was continuously introduced into a baffled tank-type reactor provided with a sweptback blade and having an internal volume of 40 L, and then, 2.8 L/hr of the solution of bisphenol A in aqueous sodium hydroxide, 0.07 L/hr of 25 mass % aqueous sodium hydroxide, 17 L/hr of water, and 0.64 L/hr of a 1 mass % triethylamine aqueous solution were further added to the reactor to perform a reaction. The reaction liquid overflown from the tank-type reactor was continuously taken out and left to stand still to separate and remove an aqueous phase, and a methylene chloride phase was then collected.

The concentration of the thus obtained polycarbonate oligomer solution (methylene chloride solution) was 318 g/L, and the concentration of a chloroformate group thereof was 0.75 mol/L. The polycarbonate oligomer had a weight-average molecular weight (Mw) of 1,190.

The weight-average molecular weight (Mw) was measured as a molecular weight (weight-average molecular weight: Mw) in terms of standard polystyrene by GPC (column: TOSOH TSK-GEL MULTIPORE HXL-M (two)+ Shodex KF801 (one), temperature: 40° C., flow rate: 1.0 ml/min, detector: RI) with tetrahydrofuran (THF) as a developing solvent.

[Production of PC-PDMS Resin]

After 20 L/hr of the polycarbonate oligomer (PCO) solution and 9.5 L/hr of methylene chloride had been mixed, a 20 mass % solution of an allylphenol terminal-modified polydimethylsiloxane (PDMS) having a number (n) of repetitions of a dimethylsiloxane unit of 40 in methylene chloride was added at 2.6 kg/hr to the mixture. After that, the materials were mixed well with a static mixer, and then the mixed liquid was cooled to from 19° C. to 22° C. with a heat exchanger.

After 0.5 kg/hr of a 1 mass % solution of triethylamine in methylene chloride had been added and mixed to the cooled mixture liquid, 1.4 kg/hr of 8.0 mass % aqueous sodium hydroxide was added to the mixture. The resultant was supplied to T K PipelineHomomixer 2SL Type (manufactured by Tokushu Kika Kogyo Co., Ltd.) having an internal volume of 0.3 liter, the homomixer including a turbine blade having a diameter of 43 mm and a turbine blade having a diameter of 48 mm, and the PCO and the PDMS were caused to react with each other under stirring at a number of revolutions of 4,400 rpm.

Subsequently, the resultant reaction liquid was cooled to from 17° C. to 20° C. with a heat exchanger. After 10.2 kg/hr of a solution of bisphenol A in aqueous sodium hydroxide, 1.5 kg/hr of 15 mass % aqueous sodium hydroxide, and 1.3 kg/hr of an 8 mass % solution of p-t-butylphenol in methylene chloride had been added to the reaction liquid after the cooling, the mixture was supplied to T. K. Pipeline Homomixer 2SL Type (manufactured by Tokushu Kika Kogyo Co., Ltd.) having an internal volume of 0.3 liter, the homomixer including a turbine blade having a diameter of 43 mm and a turbine blade having a diameter of 48 mm, and a polymerization reaction was performed under stirring at a number of revolutions of 4,400 rpm.

Further, in order for the reaction to be completed, the resultant was supplied to a tower-type stirring tank having an internal volume of 50 liters and including three paddle blades, and polycondensation was performed. Thus, a polymerization liquid was obtained.

35 L of the resultant polymerization liquid and 10 L of methylene chloride were charged into a 50 L tank-type washing tank provided with a baffle board and a paddle-type stirring blade, and were stirred at 240 rpm for 10 minutes. After that, the mixture was left to stand still for 1 hour to be separated into a methylene chloride phase containing the polycarbonate-polydimethylsiloxane copolymer, and an aqueous phase containing excessive amounts of bisphenol A and sodium hydroxide.

The methylene chloride solution containing the polycarbonate-polydimethylsiloxane copolymer (PC-PDMS) thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water so that an electric conductivity in an aqueous phase after the washing became 0.1 mS/m or less.

The concentration of the PC-PDMS in the methylene chloride solution containing the PC-PDMS after the washing was measured. As a result, the concentration was 10 mass %.

The methylene chloride solution containing the PC-PDMS thus obtained was introduced at a flow rate of 100 kg/hr into a concentrator having a volume of 210 L in which a temperature and a pressure were held at 70° C. and 0.2 MPaG, respectively to provide a 28 mass % PC-PDMS concentrated solution, and a methylene chloride gas discharged from the concentrator was recovered. After that, the PC-PDMS concentrated solution obtained in the foregoing was powdered with a kneader, and was dried with a steam-tube dryer under the condition of 120° C. to provide a polycarbonate resin powder.

The polycarbonate-polydimethylsiloxane copolymer (PC-PDMS) in the polycarbonate resin powder obtained as described above had a polydimethylsiloxane moiety content of 6 mass %, a viscosity-average molecular weight (Mv) of 17,000, and a number n of the repeating units of 40.

The polycarbonate resin powder had a ratio of particles each having a particle diameter of 300 μm or less of 55 mass %, an angle of repose of 41°, and a mean area diameter of 0.20 mm.

The resultant polycarbonate resin powder was pneumatically transported with nitrogen, and the gas and the powder were separated from the transported multiphase fluid with a bag filter. The operation was performed as follows: a centrifugal blower was used in the supply of nitrogen, a filter cloth having a polyester substrate coated with polytetrafluoroethylene (manufactured by Japan Gore-Tex Inc., GORE-TEX (trademark) Membrane Antistatic Polyester Felt, thickness: 1.60 mm, mass per unit area: 480 g/m$^2$, air permeability: 6 cm/s) was used as the filter of the bag filter, and the operation was performed at a supply rate of the powder of 100 kg/hr, a supply rate of nitrogen of 400 kg/hr, and a wind speed in a pipe of 10.8 m/s. At this time, the differential pressure of the bag filter was 1.5 kPa, and the differential pressure did not change despite the fact that the operation was performed for 3 hours. Accordingly, the transportation was able to be stably performed.

Comparative Example 1

A polycarbonate resin powder was obtained by the same method as that of Example 1 except that the 8 mass % solution of p-t-butylphenol in methylene chloride to be used at the time of the production of the PC-PDMS resin in Example 1 was added at 1.7 kg/hr. The polycarbonate-polydimethylsiloxane copolymer (PC-PDMS) in the polycarbonate resin powder at this time had a polydimethylsiloxane moiety content of 6 mass %, a viscosity-average molecular weight (Mv) of 15,000, and a number n of the repeating units of 40.

The polycarbonate resin powder had a ratio of particles each having a particle diameter of 300 μm or less of 65 mass %, an angle of repose of 43°, and an area-average diameter of 0.08 mm.

The resultant polycarbonate resin powder was pneumatically transported with nitrogen, and the gas and the powder were separated from the transported multiphase fluid with a bag filter. The same centrifugal blower and bag filter as those of Example 1 were used in the operation. Immediately after the initiation of the operation, the supply rate of the powder was 100 kg/hr, the supply rate of nitrogen was 250 kg/hr, a wind speed in a pipe was 6.8 m/s, and the differential pressure of the bag filter was 2.5 kPa. After that, however, it was confirmed that the flow rate of nitrogen reduced and the differential pressure increased. Accordingly, the operation was stopped and the inside of the pipe was observed. As a result, it was confirmed that the powder stayed in the pipe. The foregoing means that the bag filter caused clogging, and hence a transportation air amount could not be secured and the transportation could not be performed.

INDUSTRIAL APPLICABILITY

The amount of a fine powder in the polycarbonate resin powder of the present invention is small because the amount of particles each having a particle diameter of 300 μm or less is 60 mass % or less. Accordingly, the adhesive property of the polycarbonate resin powder containing the polycarbonate-polyorganosiloxane copolymer can be reduced, and hence the polycarbonate resin powder can be efficiently recovered from the inside of a multiphase fluid at the time of pneumatic transportation.

The invention claimed is:

1. A method of transporting a polycarbonate resin powder, the method comprising
pneumatically transporting the polycarbonate resin powder, and
separating the gas and the powder with a separator, wherein the separator has a filter,
wherein the filter comprises a bag filter, and the bag filter comprises a filter cloth having a polyester substrate coated with polytetrafluoroethylene.

2. The method of transporting a polycarbonate resin powder according to claim 1, wherein the pneumatically transporting is performed at a gas velocity of from 7 m/s to 30 m/s.

3. The method of transporting a polycarbonate resin powder according to claim 1, wherein the pneumatically transporting is performed using nitrogen as a gas.

4. The method of transporting a polycarbonate resin powder according to claim 1, wherein the filter cloth has a thickness of from 1 mm to 3 mm, a mass per unit area of from 300 g/m² to 600 g/m², and an air permeability of from 3 cm/s to 10 cm/s.

5. A method of transporting a polycarbonate resin powder, the method comprising:
pneumatically transporting the polycarbonate resin powder,
separating the gas and the powder with a separator, wherein the separator has a filter,
wherein the filter comprises a bag filter, and the bag filter comprises a filter cloth having a polyester substrate coated with polytetrafluoroethylene,
the polycarbonate resin powder, comprising a polycarbonate-polyorganosiloxane copolymer comprising:
a polycarbonate block (A) having a repeating unit represented by the following general formula (I); and
a polyorganosiloxane block (B) having a repeating unit represented by the following general formula (II),
wherein an amount of particles each having a particle diameter of 300 μm or less in an entirety of the powder is 60 mass % or less:

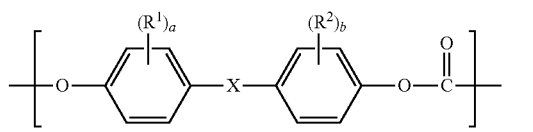

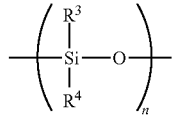

wherein:
$R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4; and
$R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and n represents a total number of siloxane repeating units in the polyorganosiloxane block.

6. The method of transporting a polycarbonate resin powder according to claim 5, wherein the pneumatically transporting is performed at a gas velocity of from 7 m/s to 30 m/s.

7. The method of transporting a polycarbonate resin powder according to claim 5, wherein the pneumatically transporting is performed using nitrogen as a gas.

8. The method of transporting a polycarbonate resin powder according to claim 5, wherein the filter cloth has a thickness of from 1 mm to 3 mm, a mass per unit area of from 300 g/m² to 600 g/m², and an air permeability of from 3 cm/s to 10 cm/s.

* * * * *